UNITED STATES PATENT OFFICE.

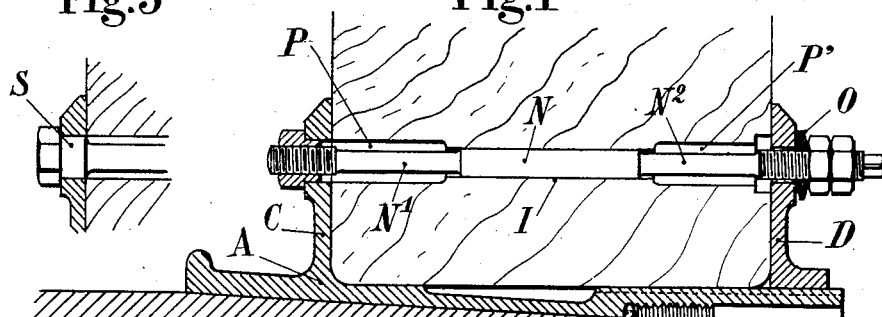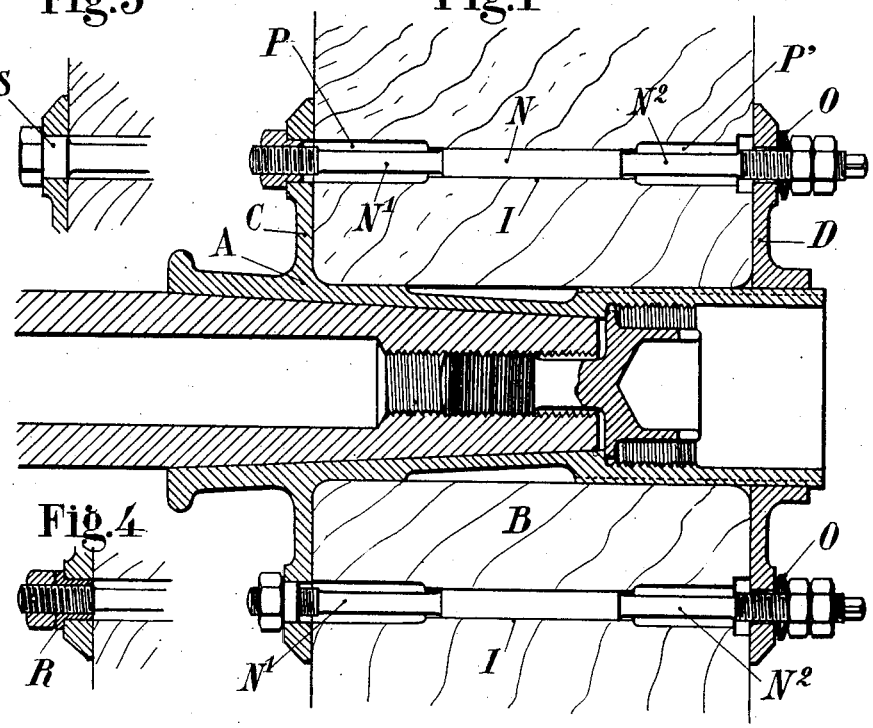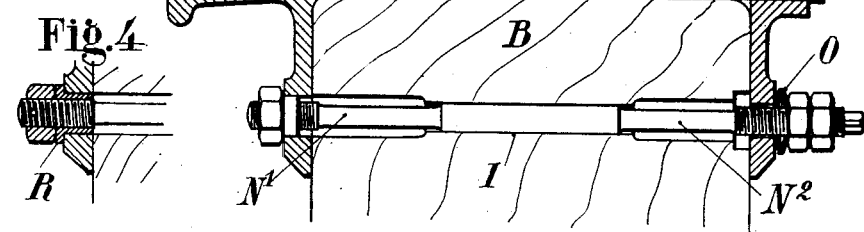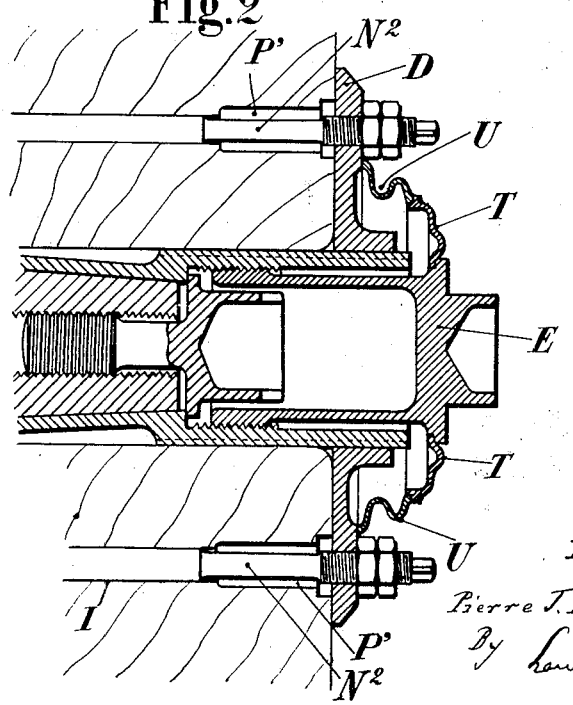

PIERRE JEAN RENÉ POSTEL-VINAY, OF PARIS, FRANCE, ASSIGNOR TO SOCIETE DES MOTEURS SALMSON (SYSTEME CANTON UNNE), OF PARIS, FRANCE.

MEANS FOR SECURING ROTARY MEMBERS OF CONTRACTILE MATERIAL TO METALLIC HUBS.

1,354,842.   Specification of Letters Patent.   Patented Oct. 5, 1920.

Application filed March 16, 1920. Serial No. 366,450.

*To all whom it may concern:*

Be it known that I, PIERRE JEAN RENÉ POSTEL-VINAY, citizen of the Republic of France, residing at 46 Boulevard de La Tour Maubourg, Paris, in the Republic of France, have invented new and useful Improvements in Means for Securing Rotary Members of Contractile Material to Metallic Hubs, of which the following is a specification.

This invention relates to means for securing rotary members of wood or other fibrous contractile material to metallic hubs, of the kind wherein said member is traversed by the bolts used for securing said member to the metallic hub.

The invention is particularly applicable to the fastening of the propellers of flying machines to metallic hubs but it may be also used with advantage for securing pulleys, wheels and other rotary members made of wood or fibrous material to a metallic hub.

In accordance with this invention, the bolts or the propeller (or other driven member of contractile material) or both the bolts and the propeller are constructed in such a manner that the bolts contact with the contractile material only by their middle portion whereas a space is provided between the end portions of the bolts and the adjacent portions of the propeller.

By means of this construction, shearing of the bolts by the propeller near the flanges of the metallic hub which is liable to occur if the bolts take some play owing to the contraction of the wood will be avoided.

The invention consists also in providing a spring device for maintaining the movable flange of the hub constantly pressed against the propeller; this insures the tightening of the latter between the two flanges of the hub even should the wood contract and thus permits the propeller to be driven.

In the annexed drawing, given by way of example:

Figure 1 is an axial section of a hub fastening device constructed in accordance with this invention.

Fig. 2 is an axial section of a modification, the spring washers of each bolt being replaced by two large spring washers.

Figs. 3 and 4 are detail sectional views showing other forms of nuts and bolt heads.

The construction shown in Fig. 1 comprises a driving metallic shank A provided with a clamping flange C integral therewith or secured thereto, a slidable clamping flange D and a driven member B of fibrous material, the whole structure being held together by any suitable number of bolts I.

In accordance with the invention, the bolts are reduced in diameter on suitable lengths toward their ends as shown at $N^1$, $N^2$ in such a manner that the stress per unit of area is about the same in said reduced parts as in the screw-threaded parts of the bolt. The intermediate part N retains its normal diameter in order that the drive may be effected by the middle part of the bolt should the flanges not tighten the driven member with a sufficient pressure to insure said drive. In order however to maintain a certain amount of pressure should the tightened member contract, spring washers O may be provided if desired.

The holes drilled through the driven member B for the passage of the bolts are provided with enlarged parts P, P' extending from the ends thereof for a length corresponding to that of the reduced bolt ends $N^1$, $N^2$ respectively. This permits the drive to be effected by the middle part of the bolt and avoids shearing the bolts near the flanges which is liable to occur when a certain amount of motion is permitted between the driven member and the flanges owing to the contraction of the material.

Other forms may be used for the bolt heads and nuts. Fig. 3 shows a bolt head provided with a collar S and Fig. 4 shows a nut bearing upon a small flange carried by a sleeve R which is thus interposed between the flange C (or D) and the nut on the one hand and the bolt stem on the other hand.

The spring washers O carried by each bolt I may be replaced by large spring washers T and U (Fig. 2) held in position by a cap E screwed in the metallic hub A, these washers being capable of maintaining the driven member clamped between the flanges even if said member should contract.

Having now described my invention, what I claim as new and desire to secure by Letters Patent is:

1. In combination, a rotary driving member, a metallic flange rigidly mounted upon said member, another metallic flange slidably mounted upon said member and adapted to rotate therewith, a driven member of contractile material mounted on said driving member between the two flanges, holes extending longitudinally through said driven member and flanges, and bolts in said holes with nuts on said bolts adapted to tighten the driven member between the two flanges, said holes and bolts contacting only along an intermediate portion, a substantial space being left between the bolts and the holes on part of their length adjacent the flanges.

2. In combination, a rotary driving member, a metallic flange rigidly mounted upon said member, another metallic flange slidably mounted upon said member and adapted to rotate therewith, a driven member of contractile material mounted on said driving member between the two flanges, holes extending longitudinally through said driven member and flanges, bolts in said holes with nuts on said bolts adapted to tighten the driven member between the two flanges, said holes and bolts contacting only along an intermediate portion, a substantial space being left between the bolts and the holes on part of their length adjacent the flanges, and spring washers interposed between adjacent faces of one or both flanges and the nuts on said bolts.

3. In combination, a rotary driving member, a metallic flange rigidly mounted upon said member, another metallic flange slidably mounted upon said member and adapted to rotate therewith, a driven member of contractile material mounted on said driving member between the two flanges, holes extending longitudinally through said driven member and flanges, bolts in said holes with nuts on said bolts adapted to tighten the driven member between the two flanges, said holes and bolts contacting only along an intermediate portion, a substantial space being left between the bolts and the holes on part of their length adjacent the flanges, a cap coaxial with the driving member and screwed therein, a shoulder on said cap and spring washers interposed between said shoulder and the adjacent flange.

In testimony whereof I have signed my name to this specification.

PIERRE JEAN RENÉ POSTEL-VINAY.